(12) United States Patent
Merkel et al.

(10) Patent No.: US 8,573,669 B2
(45) Date of Patent: Nov. 5, 2013

(54) STORAGE CONTAINER

(75) Inventors: Nicholas Earl Merkel, Canton, MI (US); Roy Thorsell, Wixom, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/435,190

(22) Filed: Mar. 30, 2012

(65) Prior Publication Data
US 2013/0257083 A1    Oct. 3, 2013

(51) Int. Cl.
*B60R 7/06*    (2006.01)

(52) U.S. Cl.
USPC .................................................. 296/37.12

(58) Field of Classification Search
USPC ............................................ 296/37.1, 37.12
See application file for complete search history.

(56) References Cited

U.S. PATENT DOCUMENTS

| | | | | |
|---|---|---|---|---|
| 4,239,277 | A * | 12/1980 | Oda | 296/37.12 |
| 5,050,922 | A * | 9/1991 | Falcoff | 296/37.7 |
| 6,135,530 | A | 10/2000 | Blaszczak et al. | |
| 6,883,680 | B2 * | 4/2005 | Hirose | 220/830 |
| 7,192,072 | B2 * | 3/2007 | Schmidt et al. | 296/37.12 |
| 7,862,096 | B2 | 1/2011 | Kim et al. | |

* cited by examiner

*Primary Examiner* — Dennis Pedder
(74) *Attorney, Agent, or Firm* — Gifford, Krass, Sprinkle, Anderson & Citkowski, P.C.

(57) ABSTRACT

A storage container having a pivotable door pivotable between an open and closed position is provided. The storage container includes a housing configured to hold the pivotable door and a biasing member operable to bias the pivotable door between the open and closed position. A mount is disposed on the pivotable door. The mount includes a loading member. The biasing member is operatively connected to the mount. The biasing member is configured to engage the loading member so as to retain the biasing member in a fixed position with respect to the pivotable door prior to assembling the pivotable door to the housing. A method for installing or assembling a storage container having a pivotable door is also provided.

12 Claims, 5 Drawing Sheets

A method of assembling a storage container having a housing, a pivotable door pivotable between an open position and a closed position, a mount, and a biasing member mounted to the mount and operatively connected to the pivotable door, the biasing member configured to urge the pivotable door into the open position, the housing configured to hold the pivotable door.

↓

Providing a loading member operable to restrain the biasing member

↓

Engaging the biasing member to the loading member so as restrain the biasing member from biasing the pivotable door

↓

Installing the pivotable door to the housing

↓

Disengaging the biasing member from the pivotable door

STORAGE CONTAINER

FIELD OF THE INVENTION

The invention relates to a storage container having a pivotable door pivotable between an open and closed position. A biasing member is configured to engage the loading member so as to retain the biasing member in a fixed position with respect to the pivotable door prior to installing the pivotable door onto a housing. A method for assembling a storage container having a pivotable door is also provided.

BACKGROUND OF THE INVENTION

Storage containers having a pivotable door are known. The pivotable doors include a biasing member operable to bias the door between an open and closed position. However, the installation of the pivotable door with respect to the housing may be difficult as the biasing member may interfere. Thus, the installer must physically retain the biasing member in a fixed position to prevent the biasing member from interfering as the pivotable door is mounted into the housing.

SUMMARY OF THE INVENTION

According to one aspect of the invention, a storage container having a pivotable door pivotable between an open and closed position is provided. The storage container includes a housing configured to hold the pivotable door. A biasing member is operable to bias the pivotable door between an open and closed position with respect to the housing.

A mount is disposed on the pivotable door. The mount includes a loading member. The biasing member is operatively connected to the mount. The loading member is configured to retain the biasing member in a fixed position with respect to the pivotable door so as to facilitate the assembly of the pivotable door to the housing.

According to another aspect of the invention a method for assembling a storage container is provided. The method includes providing a housing, a pivotable door, and a biasing member. The pivotable door is configured to pivot with respect to the housing. Specifically, the biasing member is operable to pivot the pivotable door between an open and closed position.

The method includes providing a mount on the pivotable door. The mount includes a loading member. The loading member is configured to engage the biasing member so as to retain the biasing member in a fixed position relative to the pivotable door. The method further includes the step of engaging the biasing member to the loading member and installing the pivotable door into the housing. The method further includes the step of disengaging the biasing member from the loading member so as to allow the biasing member to urge the pivotable door to an open position with respect to the housing.

BRIEF DESCRIPTION OF THE DRAWINGS

Advantages of the present invention will be readily appreciated as the same becomes better understood by reference to the following detailed description when considered in connection with the accompanying drawings wherein.

2

Figure 1:
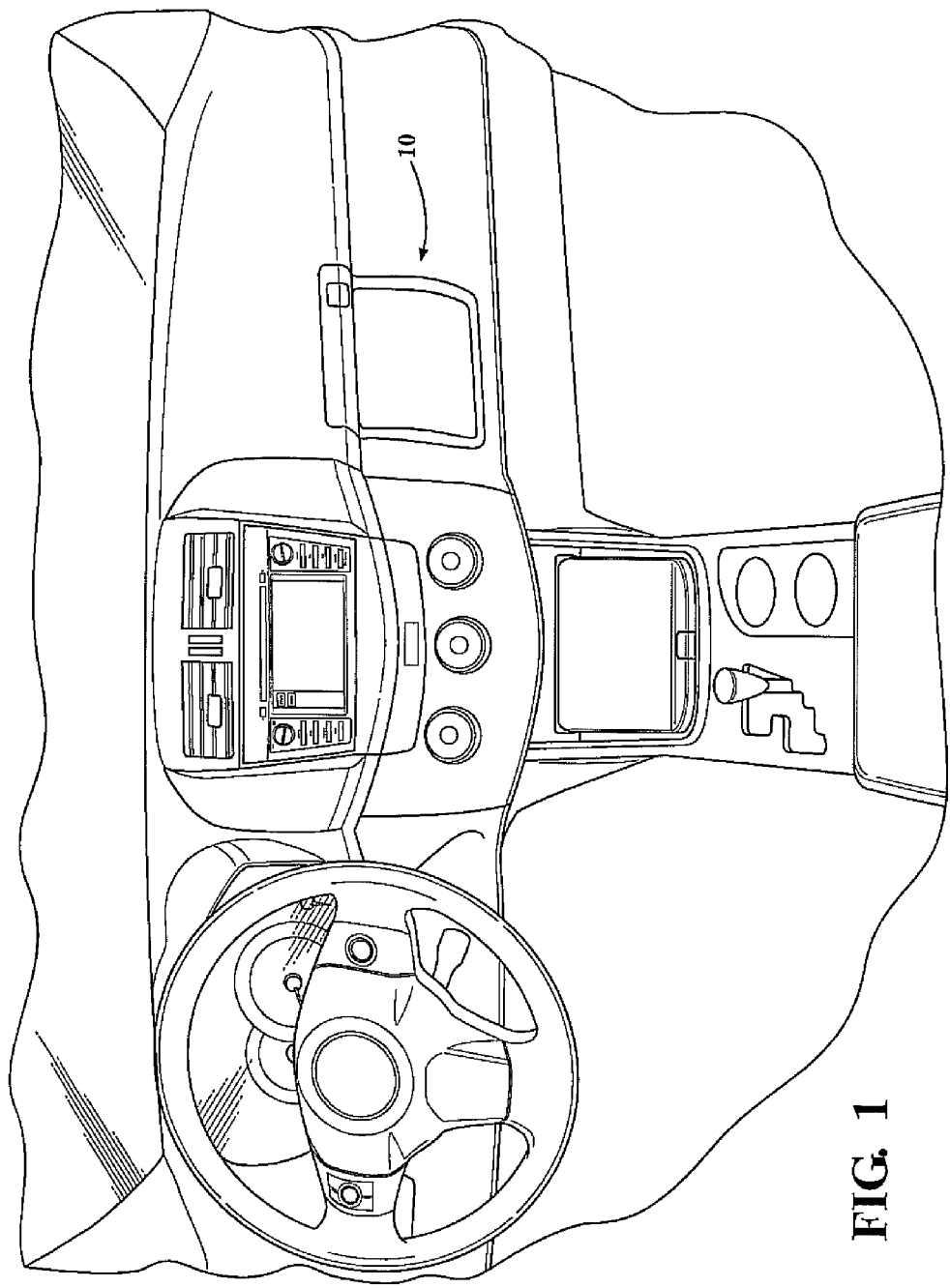
FIG. 1 is a perspective view showing the storage container mounted to the instrument panel assembly.
Figure 2:
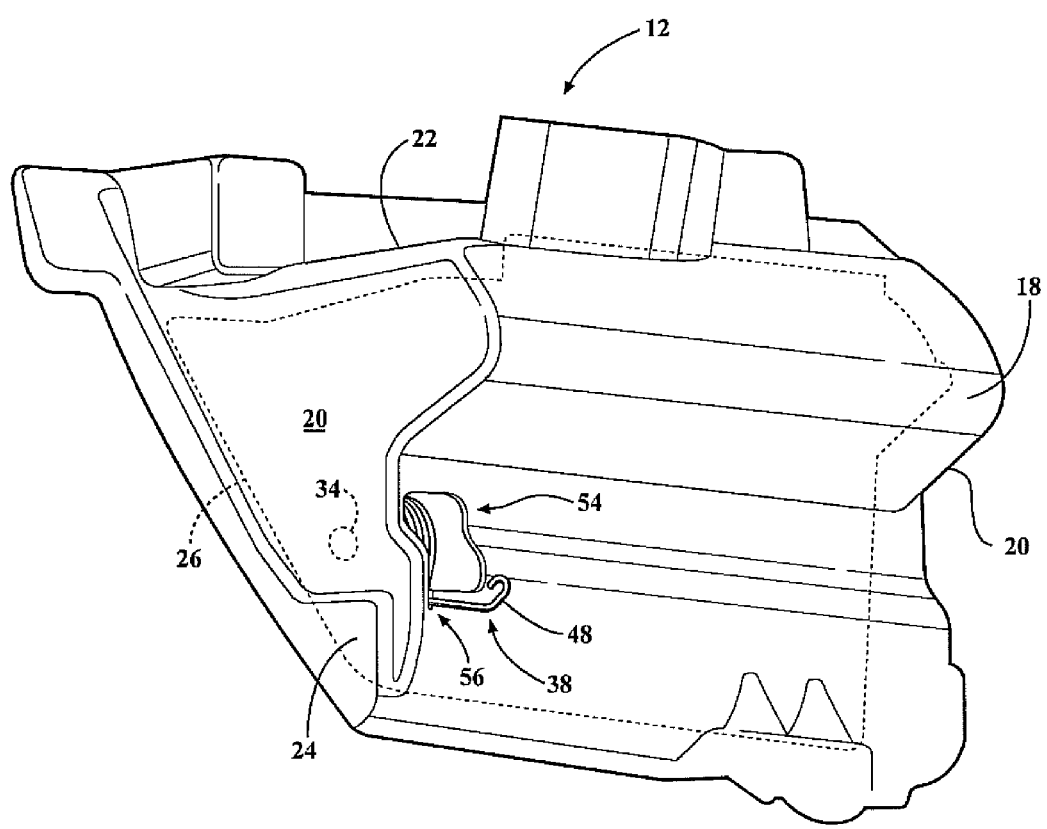
FIG. 2 is a perspective view showing the back portion of the storage container.
Figure 3:
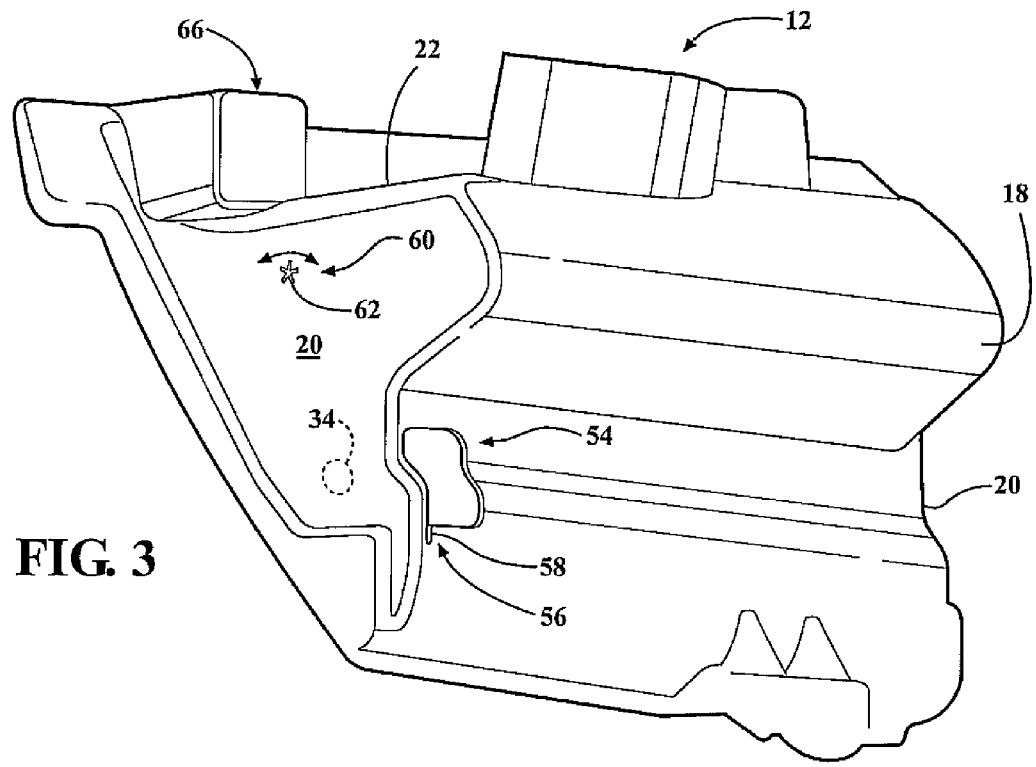
FIG. 3 is a perspective view of the back side of the housing.
Figure 4:
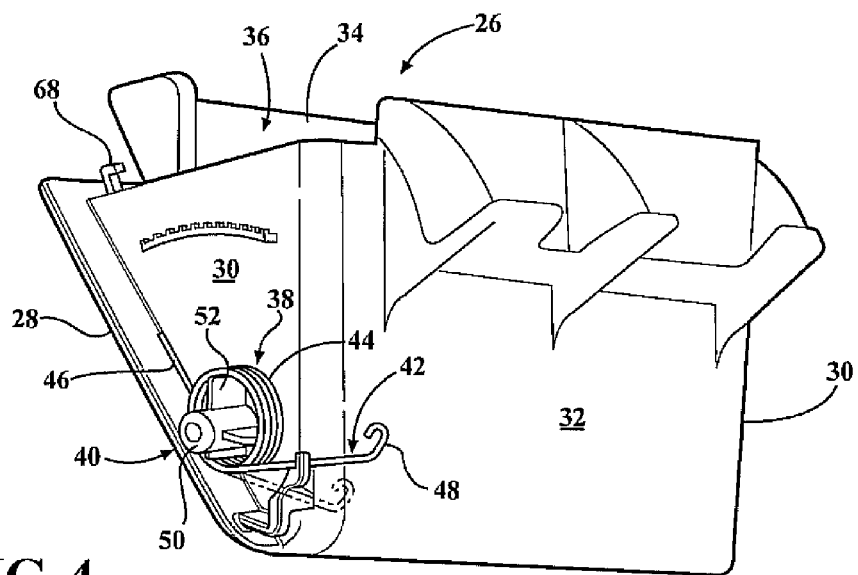
Figure 5:
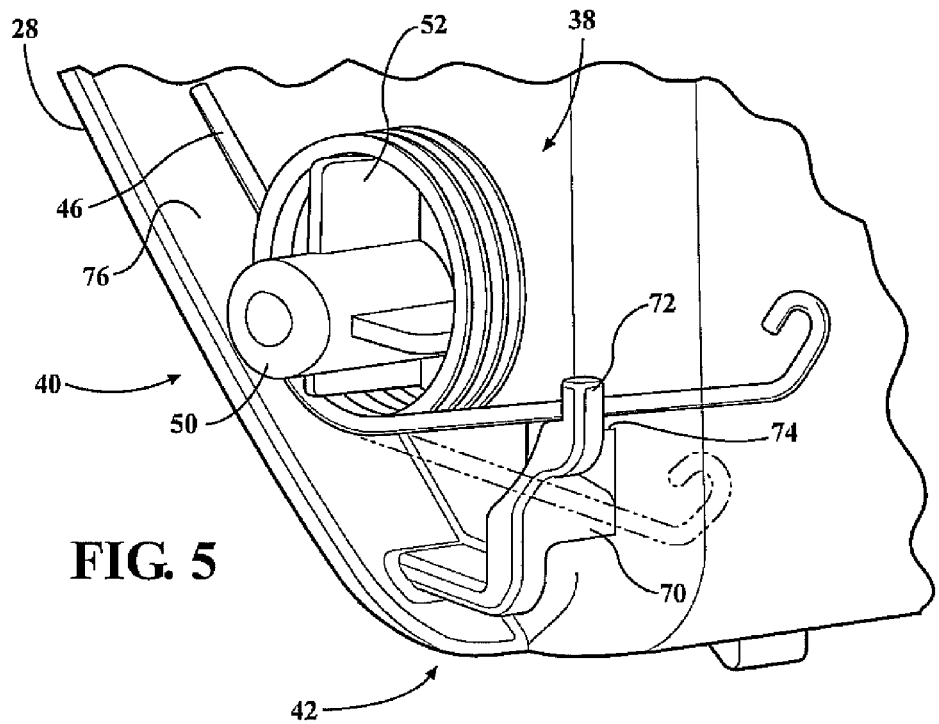
Figure 6:
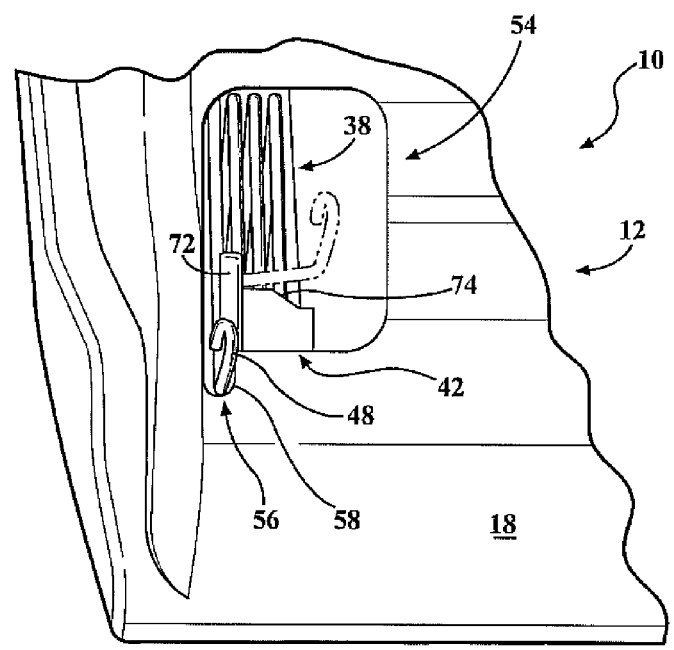

FIG. 4 is an exploded viewing showing the back side of the pivotable door;

FIG. 5 is an isolated view showing the biasing member engaged with the loading member; and FIG. 6 is a perspective isolated view showing the biasing member removed from the loading member after installation of the pivotable door with respect to the housing.

FIG. 7 is a flow diagram showing the method for assembling a storage container having a pivotable door.

DETAILED DESCRIPTION OF THE INVENTION

With reference now to FIGS. 1-6, a first preferred embodiment of a storage container 10 is provided. The storage container 10 includes a housing 12. The housing 12 may be formed of an injection molded material such as plastic or some other polymer composite. The housing 12 may include attachment features configured to attach the storage container 10 to an instrument panel assembly 14 of an automotive vehicle 16.

The housing 12 includes a housing back wall 18, a pair of housing side walls 20 spaced apart from each other, and a housing top wall 22. The housing top wall 22 and the housing back wall 18 extend between respective housing side walls 20 so as to enclose a space having a housing opening 24.

The storage container 10 further includes a pivotable door 26. The pivotable door 26 is configured to cover the housing opening 24. The pivotable door 26 may include a first front wall 28, a pair of first side walls 30 spaced apart from each other, and a first back wall 32 spaced apart from the first front wall 28. The first back wall 32 and the first front wall 28 extend between each of the first side walls 30 so as to form a first opening 34 and a storage bin 36 configured to hold articles. When in the closed position the first opening 34 is covered by the housing top wall 22. When in the closed position, the first opening 34 is exposed so as to allow the storage bin 36 to receive articles therein.

Though the figures show the first front and first back walls 28, 32 angled relative to each other and being connected at the bottom ends to define storage bin 36 having a generally "V" shaped profile, it should be appreciated that the storage bin 36 may be dimensioned otherwise.

A biasing member 38 is operable to bias the pivotable door 26 between the open and closed position with respect to the housing 12. In the open position the first front wall 28 of the pivotable door 26 is displaced relative to the housing opening 24 so as to provide access to the storage bin 36 of the pivotable door 26. In the closed position the first front wall 28 of the pivotable door 26 is generally flush along the same plane as the exterior side edges of respective housing side walls 20.

The storage container 10 includes a mount 40. The mount 40 is formed on a first side wall 30 of the pivotable door 26. The mount 40 is configured to support the biasing member 38. The mount 40 may be integrally formed to the first side wall 30 or attached thereto using known attachment methods such as vibrational welding, a screw, or the like.

The mount 40 includes a loading member 42. The biasing member 38 is operatively connected to the mount 40 and is configured to engage the loading member 42. The loading member 42 is operable to restrain the biasing member 38 so as to place the biasing member 38 in a fixed position with respect to the pivotable door 26. Accordingly, the pivotable door 26 is operable to preload the biasing member 38 prior to installation of the pivotable door 26 into the housing 12.

With reference now to FIG. 4 an example of a biasing member 38 adaptable for use herein is provided. The biasing member 38 includes a center portion 44 and a second portion 46 spaced apart and opposite a first portion 48. The center portion 44 is operable to bias the first portion 48 away from the second portion 46.

The center portion 44 of the biasing member 38 may be a coil. A pair of legs extend from opposite ends of the coil. Each of the pair of legs is a corresponding first and second portion 48, 46. The pair of legs extending oppositely from a center coil. The biasing member 38 may be formed of a resilient material such as steel.

The center portion 44 of the biasing member 38 is mounted to the mount 40. The mount 40 may further include a first shaft 50. The first shaft 50 extends outwardly from a first side wall 30 of the pivotable door 26. A second shaft (not shown) may be disposed on the other of the first side walls 30 of the pivotable door 26. The shafts 50 are aligned along the same axis. The body of each of the shafts 50 is generally cylindrical.

The housing 12 includes a first opening 34 on one of the housing side walls 20 and a second opening (not shown) on the other of the housing side walls 20. The first and second openings 34 are operable to receive the respective first and second shafts 50. The cylindrical body of the shafts 50 facilitates the rotation of the shafts 50 within respective first and second openings 34.

The first shaft 50 may further include a plurality of flanges 52 extending radially from a center point of the first shaft 50. The flanges 52 are generally elongated and are configured to help hold the center portion 44 of the biasing member 38 in a fixed position. The center portion 44 is dimensioned to fittingly engage the outer edges of the flanges 52 of the first shaft 50 so as to help retain the center portion 44 thereto.

Prior to installing the pivotable door 26 to the housing 12, the center portion 44 of the biasing member 38 is mounted to the first shaft 50. The second portion 46 of the biasing member 38 is placed against a portion of pivotable door 26 and urges the pivotable door 26 outwardly away from the first shaft 50. The first portion 48 of the biasing member 38 is connected to the loading member 42. In such a manner the biasing member 38 is preloaded onto the pivotable door 26.

The housing back wall 18 may further include a window 54. The window 54 is disposed on the housing back wall 18 so as to receive a first portion 48 of the biasing member 38 when the pivotable door 26 is mounted thereto. The window 54 is further dimensioned so as to allow the biasing member 38 to be removed or disengaged from the loading member 42. Accordingly, the pivotable door 26 may be preloaded as described above, and the first portion 48 may be disengaged from the loading member 42 when the pivotable door 26 is installed onto the housing 12. Upon insertion of the pivotable door 26 into the housing 12, the user may simply disengage the biasing member 38 from the loading member 42 so as to allow the biasing member 38 to urge the front wall of the pivotable door 26 away from the housing back wall 18. Thus the storage container 10 may be assembled without having the biasing member 38 interfering.

The window 54 may further include a catch 56. The catch 56 is configured to hold the first portion 48 of the biasing member 38 so as to allow the biasing member 38 to urge the pivotable door 26 to an open position with respect to the housing 12. For instance, the catch 56 may be a slot 58 extending downwardly from a portion of a bottom peripheral edge of the window 54. The slot 58 may be dimensioned so as to receive the first portion 48 of the biasing member 38. Accordingly, the biasing member 38 is operable to urge a first portion 48 of the biasing member 38 downwardly against the distal end of the slot 58.

The second portion 46 of the biasing member 38 is urged in the opposite direction from the first portion 48. The second portion 46 of the biasing member 38 may be fixedly mounted or engaged to an inner surface of the front wall of the pivotable door 26. Thus the biasing member 38 continuously urges the front wall of the pivotable door 26 away from a housing back wall 18.

The storage container 10 may further include a dampener 60 operable to regulate the movement of the pivotable door 26 between the open and closed position. The dampener 60 may include a rotatable member 62 frictionally mounted to an inner surface of the housing side wall 20. The rotatable member 62 is operable to resist rotation or pivoting of the pivotable door 26 so as to dampen or slow the movement of the pivotable door 26 from a closed to an open position. For instance, the pivotable door 26 may include a guide 64 disposed on an outer surface of the first side wall 30 having the mount 40. The rotatable member 62 is configured to engage the guide 64 so as to slow the pivoting of the pivotable door 26.

The storage container 10 may further include an actuator 66 and a retaining mechanism 68. The retaining mechanism 68 may be mounted to a top side edge of the inner surface of the pivotable door 26. The actuator 66 is operatively connected to the retaining mechanism 68. The retaining mechanism 68 is configured to retain the pivotable door 26 in a closed position. The actuator 66 may be actuated so as to release the pivotable door 26 from the housing 12 whereupon the biasing member 38 is free to urge the pivotable door 26 into the open position.

With reference now to FIGS. 4-6, a first preferred embodiment of the loading member 42 is provided. The loading member 42 is adjacent a bottom side edge of the pivotable door 26 and is spaced apart from the mount 40. The loading member 42 includes a base portion 70 having a first elongated portion 72 extending upwardly from the base portion 70. The first elongated portion 72 is spaced apart from the first side wall 30. A support edge 74 extends inwardly with respect to the first side wall 30 so as to place the first elongated portion 72 generally orthogonal to the support edge 74. The first elongated portion 72 extends upwardly beyond the support edge 74.

The mount 40 is disposed adjacent a bottom portion of the pivotable door 26 where the first front wall 28 and first back wall 32 connect. The first side walls 30 extend between respective first front and first back walls 28, 32 and are displaced inwardly with respect to the outer side edge of the first front and first back wall 28, 32, so as to define a side flange 76 on each side of the first front wall 28.

The biasing member 38 is shown mounted to the mount 40. Specifically, the center portion 44 of the biasing member 38 is mounted to the first shaft 50. The first portion 48 of the biasing member 38 is shown engaged with the support edge 74. The first elongated portion 72 is operable to prevent the first portion 48 from being displaced axially away from the support edge 74. Specifically, the first elongated portion 72 is configured to prevent the first biasing member 38 from sliding away from the first side wall 30 and off the support edge 74. The center portion 44 of the biasing member 38 is operable to urge the first portion 48 downwardly against the support edge 74 as shown.

The second portion 46 of the biasing member 38 is operatively engaged with the side flange 76 of the first side wall 30. Thus the loading member 42 retains the biasing member 38 in a fixed position with respect to the door. The first and second portions 48, 46 of the biasing member 38 are restrained from expansion by the side flange 76 and the support edge 74 of the loading member 42.

Accordingly, during assembly the installer may simply load the biasing member 38 onto the loading member 42.

Specifically the center portion 44 of the biasing member 38 is mounted onto the first shaft 50. The inner edges of the coil are biased against the outer edge of respective tabs. The first portion 48 of the biasing member 38 is manipulated over the first elongated portion 72 and allowed to come to rest onto the support edge 74. The second portion 46 of the biasing member 38 is placed along the side flange 76. In such a manner, the biasing member 38 is fixed relative to the pivotable door 26. The pivotable door 26 may then be inserted into the housing opening 24 wherein the first and second shafts 50 may be positioned to engage respective side wall openings 24, 34, 52 of the housing 12.

With reference now to FIG. 5, a perspective view showing the housing back wall 18 of the housing 12 is provided. The back wall includes a window 54. The window 54 is disposed so as to be registered provide access to the loading member 42. As shown, the window 54 is formed on a lower bottom portion of the housing back wall 18 adjacent a housing side wall 20.

The pivotable door 26 is inserted into the housing 12 wherein the first and second shafts 50 are inserted into respective first and second openings 34. The installer need not have hold the biasing member 38 to prevent the biasing member 38 from interfering and is thus free to concentrate on the insertion of the first and second shafts 50 into their respective openings 24, 34, 52. It should be appreciated that the housing side walls 20 are resilient so as to allow for expansion of the housing 12 to fit the first and second shafts 50.

When the pivotable door 26 is mounted to the housing 12, the first portion 48 of the biasing member 38 is received through the opening of the window 54. The first portion 48 extends beyond an outer surface of the back wall. Thus the user may simply lift the first portion 48 over the first elongated portion 72 and into the catch 56 wherein the first portion 48 is operably engaged with a distal end of the slot 58 so as to bias against a fixed portion of the housing 12. Naturally, the second portion 46 remains operatively connected to the outer edge of the first side wall 30 thus continuously urging the front wall of the pivotable door 26 towards an open position.

A retaining mechanism 68 is operable to retain the front wall of the pivotable door 26 in a closed position with respect to the opening of the housing 12. Actuation of the actuator 66 is operable to release the front wall and allow the biasing member 38 to urge the pivotable door 26 to an open position. The dampener 60 is operable to slow and regulate the movement of the pivotable door 26 between the closed and open position.

With reference now to FIG. 7, a method for assembling a storage container 10 having a pivotable door 26 is provided. The housing 12 includes a housing back wall 18, a pair of housing side walls 20 spaced apart from each other, and a housing top wall 22. The housing top wall 22 and the housing back wall 18 extend between respective housing side walls 20 so as to enclose a space having a housing opening 24

The pivotable door 26 includes a front wall configured to cover the housing opening 24. The pivotable door 26 is configured to cover the housing opening 24. The pivotable door 26 may further include a pair of first side walls 30 spaced apart from each other, and a first back wall 32 spaced apart from the front wall. The first back wall 32 and the first front wall 28 extend between each of the first side walls 30 so as to form a first opening 34 and a storage bin 36 configured to hold articles. When in the closed position the first opening 34 is covered by the housing top wall 22. When in the closed position, the first opening 34 is exposed so as to allow the storage bin 36 to receive articles therein.

The pivotable door 26 further includes a mount 40. A mount 40 is disposed on the pivotable door 26, the mount 40 having a loading member 42, the biasing member 38 operatively connected to the mount 40 wherein the loading member 42 is configured to engage the biasing member 38 so as to restrain the biasing member 38 in a fixed position with respect to the pivotable door 26.

A biasing member 38 is operable to bias the pivotable door 26 between the open and closed position with respect to the housing 12. In the open position the front wall of the pivotable door 26 is displaced relative to the housing opening 24 so as to provide access to the storage bin 36 of the pivotable door 26. In the closed position the front wall of the pivotable door 26 is generally flush along the same plane as the exterior side edges of respective housing side walls 20.

The pivotable door 26 further includes a mount 40 formed on a first side wall 30 of the pivotable door 26. The mount 40 is configured to support the biasing member 38. The mount 40 may be integrally formed to the first side wall 30 or attached thereto using known attachment methods such as vibrational welding, a screw, or the like.

The method includes the step of providing a loading member 42 and engaging the biasing member 38 to the loading member 42. The biasing member 38 is operatively connected to the mount 40 and is configured to engage the loading member 42. The loading member 42 is operable to restrain the biasing member 38 so as to place the biasing member 38 in a fixed position with respect to the pivotable door 26. Accordingly, the pivotable door 26 is configured to preload the biasing member 38 prior to installation of the pivotable door 26 into the housing 12. For instance, the biasing member 38 is mounted onto the mount 40, a first portion 48 of the biasing member 38 is engaged with the loading member 42, installing the pivotable door 26 into the housing 12, and releasing the biasing member 38 from the loading member 42.

The method proceeds to the step of disengaging the biasing member 38 from the pivotable door 26. Accordingly, the method allows for the biasing member 38 to be retained in a fixed position with respect to the pivotable door 26 and thus prevents the biasing member 38 from interfering with the installation of the pivotable door 26 to the housing 12.

The method may further include the step of providing a window 54 on the back wall of the housing 12 wherein the window 54 is dimensioned to receive the first portion 48 of the biasing member 38 when the pivotable door 26 is mounted to the housing 12. The method may further include the step of removing the first portion 48 from the loading member 42 and placing the first portion 48 of the biasing member 38 into the catch 56.

The invention claimed is:

1. A storage container having a pivotable door pivotable between an open and closed position, the storage container comprising:
   a housing configured to hold the pivotable door having a pair of first side walls, a first front wall spaced apart and opposite a first back wall, each of the pair of first side walls spaced apart from each other, the first front and back walls extending between each of the pair of first side walls, a window disposed on the first back wall;
   a biasing member operable to bias the pivotable door between the open and closed position with respect to the housing; and
   a mount and a loading member spaced apart from the mount, both the mount and the loading member disposed on the pivotable door, the biasing member operatively connected to the mount, the biasing member configured to engage the loading member, the mount and loading member working in concert so as to hold the biasing member in a compressed position when mounting the pivotable door to the storage container, the window dimensioned to receive a first portion of the biasing member so as to allow the biasing member to be removed from the loading member so as to facilitate the assembly of the pivotable door to the housing.

2. The storage container as set forth in claim 1, wherein the window further includes a catch configured to hold the first portion of the biasing member so as to allow the biasing member to urge the pivotable door to an open position with respect to the housing.

3. The storage container as set forth in claim 2, wherein the biasing member includes a center portion and a second portion, the center portion operable to bias the first portion away from the second portion.

4. The storage container as set forth in claim 1, wherein the mount is a shaft extending outwardly from a side wall of the pivotable door, the housing includes an opening configured to receive the shaft, the shaft pivotable within the opening.

5. The storage container as set forth in claim 1, further including a dampener operable to regulate the movement of the pivoting between the open and closed positions.

6. The storage container as set forth in claim 1, further including an actuator and a retaining mechanism, the retaining mechanism operable to retain the pivotable door in a closed position, the actuator operable actuate the retaining mechanism so as to release the pivotable door from the housing.

7. The storage container as set forth in claim 1, wherein the pivotable door includes a pair of first side walls, a first front wall spaced apart and opposite a first back wall, each of the pair of first side walls spaced apart from each other, the first front and back walls extending between each of the pair of first side walls so as to form a storage bin.

8. The storage container as set forth in claim 7, wherein the housing is disposed within the instrument panel of an automotive vehicle.

9. The storage container as set forth in claim 1, wherein the loading member includes a first elongated portion generally orthogonal to a support edge, the support edge operable to retain the first portion in a fixed position relative to the pivotable door.

10. The storage container as set forth in claim 2, wherein the catch is a slot extending from an inner peripheral edge of the window.

11. A method of assembling a storage container, the storage container having a housing, a pivotable door pivotably disposed within the housing, the pivotable door having a first front wall spaced apart a first back wall, and a pair of side walls spaced apart from each other and extending between the first front and first back walls, the pivotable door pivotable between an open position and a closed position, a mount, and a biasing member mounted to the mount and operatively connected to the pivotable door and configured to urge the pivotable door into the open position, the housing configured to hold the pivotable door, the method comprising the steps of:

providing a loading member operable to restrain the biasing member;

providing a window on the first back wall, the window dimensioned as to receive a first portion of the biasing member;

engaging the biasing member to the loading member so as restrain the biasing member from biasing the pivotable door;

installing the pivotable door to the housing; and engaging the first portion of the biasing member so as to disengage the first portion of the biasing member from the pivotable door.

12. The method as set forth in claim 11, further including the step of providing a catch operable to engage the first portion, and disengaging the first portion from the loading member after installing the pivotable door to the housing and engaging the first portion with the catch.

* * * * *